(12) United States Patent
Walters

(10) Patent No.: US 8,118,312 B2
(45) Date of Patent: Feb. 21, 2012

(54) QUICK CHANGE CENTERING TOOL HOLDER

(75) Inventor: Daniel Walters, Bradenton, FL (US)

(73) Assignee: American Torch Tip Co., Bradenton, FL (US)

( * ) Notice: Subject to any disclaimer, the term of this patent is extended or adjusted under 35 U.S.C. 154(b) by 1004 days.

(21) Appl. No.: 11/700,603

(22) Filed: Jan. 31, 2007

(65) Prior Publication Data

US 2008/0179839 A1     Jul. 31, 2008

Related U.S. Application Data (63) Continuation-in-part of application No. 11/452,834, filed on Jun. 14, 2006, now Pat. No. 7,549,953.

(51) Int. Cl.
*B23B 31/00* (2006.01)
*B23B 31/20* (2006.01)

(52) U.S. Cl. ............ 279/143; 279/42; 279/48; 279/144; 279/145; 409/232; 408/239 A; 483/65

(58) Field of Classification Search .............. 409/232, 409/234; 279/143–145, 42, 43.1, 46.1, 46.2, 279/46.4, 48, 50, 52, 83, 43.4, 901, 76, 102, 279/103; 483/65, 52, 59; 82/158, 160; 408/226
See application file for complete search history.

(56) References Cited

U.S. PATENT DOCUMENTS

| | | | |
|---|---|---|---|
| 2,485,799 A * | 10/1949 | Woytych | 279/76 |
| 2,491,167 A * | 12/1949 | Drew | 279/48 |
| 3,557,419 A * | 1/1971 | Flannery | 407/36 |
| 4,436,463 A * | 3/1984 | Rea | 409/232 |
| 4,496,163 A * | 1/1985 | Bernfeld | 279/145 |
| 4,668,138 A | 5/1987 | Carter | |
| 4,714,389 A | 12/1987 | Johne | |
| 4,817,972 A * | 4/1989 | Kubo | 279/42 |
| 5,263,918 A * | 11/1993 | Ruetschle et al. | 483/10 |
| 5,405,220 A * | 4/1995 | Ishikawa | 408/56 |
| 5,452,631 A | 9/1995 | Erickson | |
| 5,593,258 A | 1/1997 | Matsumoto et al. | |
| 5,758,883 A * | 6/1998 | Brian | 279/53 |
| 5,868,533 A * | 2/1999 | Fiala | 408/226 |
| 6,231,282 B1 * | 5/2001 | Yoneyama et al. | 409/234 |
| 6,270,086 B1 | 8/2001 | Lloyd | |
| 6,299,180 B1 * | 10/2001 | Satran et al. | 279/83 |
| 6,352,395 B1 | 3/2002 | Matsumoto et al. | |
| 6,517,299 B1 | 2/2003 | Lin | |
| 6,789,299 B1 | 9/2004 | Kidder | |
| 6,908,085 B2 | 6/2005 | Gerber | |

(Continued)

*Primary Examiner* — Eric A Gates
*Assistant Examiner* — Bayan Salone
(74) *Attorney, Agent, or Firm* — Jason L. DeFrancesco (57) ABSTRACT

A tool-holding system for centering a cutting tool to be utilized by a machine is disclosed herein. The tool-holding system includes a housing defining a tapered recess to be provided to the machine for receiving at least a portion of the tool, a first alignment portion provided to the housing, and an adaptor including a tapered shank that is to be received within the tapered recess defined by the housing. The adaptor includes an aperture formed in the adaptor for receiving a proximate end of the tool and a tool fastener for securing the proximate end of the tool within the aperture at a predetermined angular orientation therein. A second alignment portion is provided to the adaptor to cooperate with the first alignment portion to establish a predetermined angular orientation of the adaptor relative to the housing while the shank of the adaptor is at least partially inserted into the tapered recess. A fastener is also provided for securing the adaptor within the tapered recess of the housing.

18 Claims, 5 Drawing Sheets

U.S. PATENT DOCUMENTS

| | | |
|---|---|---|
| 6,923,451 B2 | 8/2005 | Taguchi et al. |
| 6,929,426 B2 * | 8/2005 | Thiele et al. .................. 407/33 |
| 6,939,213 B2 * | 9/2005 | Lovchik et al. ............... 451/360 |
| 7,112,020 B2 * | 9/2006 | Sheffler et al. ................ 409/234 |
| 7,320,568 B2 * | 1/2008 | Matsumoto et al. .......... 409/234 |
| 7,628,571 B2 * | 12/2009 | Chen ............................. 409/234 |
| 2004/0081523 A1 * | 4/2004 | Vasudeva et al. ............. 408/240 |
| 2006/0233622 A1 * | 10/2006 | Bauman .................... 408/239 R |

* cited by examiner

QUICK CHANGE CENTERING TOOL HOLDER

CROSS-REFERENCE TO RELATED APPLICATIONS

This application is a continuation-in-part of U.S. patent application Ser. No. 11/452,834, filed on Jun. 14, 2006, now U.S. Pat. No. 7,549,953, issued Jun. 23, 2009, the entire contents of which are hereby incorporated by reference and for which priority is claimed under 35 U.S.C §120.

BACKGROUND OF THE INVENTION

1. Field of the Invention

The present invention is directed generally to a tool holder, and more specifically, to an easy-centering cutting tool holder for interchangeably securing a tool to a machine with a cutting edge of the tool centered.

2. Description of Related Art

Conventional machines such as boring machines, threading machines, grooving machines, trepanning machines, and any other machine that must have a cutting edge of a tool secured thereto centered at a desired location relative to a workpiece are provided with a chuck for receiving the tool. In use, the machine holds the tool in contact with a piece of material referred to herein as a workpiece to remove material from the workpiece to form an end product, or a component thereof. One end of the tool is adapted to be received into the chuck of the machine while the other end is configured to support a cutting tip that will actually contact and cut material from the workpiece.

The cutting tip secured to the end of the tool has a configuration that requires the cutting tip to be centered, which means having a predetermined angular orientation within the chuck to be properly positioned relative to the workpiece. Small deviations from this centered position can result in the formation of an undesirable end product from the workpiece. Traditionally, operators have inserted the tool into the chuck at what they perceive with the naked eye to be the proper angular orientation therein. Such approximation of the tool's angular orientation is often inaccurate, requiring the operator to gradually position the tool near the workpiece and repeat the process to achieve the proper angular orientation. This is time consuming, and preoccupies the machine leading to significant periods of down time.

Previous attempts to secure the tool within a collet received within the chuck requires the tool to be properly positioned, followed by the tightening of a fastener that secures the collet within the chuck. The tool must first be properly positioned within the collet in the chuck, followed by the tightening of the fastener, which often requires rotation in a tightening direction about a central axis of the collet. This rotation of the fastener during tightening can inadvertently lead to rotation of the collet, and accordingly, the tool disposed therein. And again, when inadvertent rotation of the tool occurs, the tool's position is not centered, thereby resulting in erroneous machining of the workpiece, requiring repeated attempts to properly center the cutting edge and significant down time of the machine. Additionally, failure to properly center the cutting tip of the tool can result in premature wear of the cutting tip and possibly excessive vibrations of the tool and machine.

Conventional tool holders, once installed with the tool in the machine at the proper angular orientation, also require the operator to slowly adjust the position of the tool adjacent to the workpiece to determine the distance that the tool extends outwardly from the machine. This process, commonly referred to as "touching off" the tool to the workpiece, must be repeated each time a new tool is coupled to the machine, and the measured distance manually entered into a computer for controlling operation of the machine. Thus, only the tool currently in use by the machine can be properly configured for such use, and the touching off process must be repeated when that tool is replaced, again leading to significant down time of the machine.

Accordingly, there is a need in the art for a centering tool holder for releasably installing a tool on a machine for performing machining operations on a workpiece. The tool holder can readily center the tool to establish a predetermined angular orientation of the tool for a given machining operation, establish a known clearance between the workpiece and the tool when installed on the machine, and can optionally be compatible with a variety of tools.

BRIEF SUMMARY OF THE INVENTION

According to one aspect, the present invention provides a tool-holding system for centering a cutting tool to be utilized by a machine is disclosed herein. The tool-holding system includes a housing defining a tapered recess to be provided to the machine for receiving at least a portion of the tool, a first alignment portion provided to the housing, and a adaptor including a tapered shank that is to be received within the tapered recess defined by the housing. The adaptor includes an aperture formed in the adaptor for receiving a proximate end of the tool and a tool fastener for securing the proximate end of the tool within the aperture at a predetermined angular orientation therein. A second alignment portion is provided to the adaptor to cooperate with the first alignment portion to establish a predetermined angular orientation of the adaptor relative to the housing while the shank of the adaptor is at least partially inserted into the tapered recess. A fastener is also provided for securing the adaptor within the tapered recess of the housing.

According to another aspect, the present invention further includes a set of threads about an exterior surface of the housing for releasably receiving the fastener. The set of threads can optionally be provided about a periphery of the tapered recess.

According to another aspect, an external surface of the housing is generally cylindrical and untapered, and is generally parallel to a longitudinal axis of the housing.

According to yet another aspect, the first alignment portion is an aperture formed in the housing adjacent to an open end of the tapered recess, and wherein the second alignment portion is a male extension extending outwardly generally away from the adaptor.

According to yet another aspect, the first alignment portion comprises a plurality of apertures formed in the housing adjacent to the open end of the tapered recess, and wherein the second alignment portion comprises a plurality of male extensions extending outwardly generally away from the adaptor. The plurality of apertures can optionally be approximately equally spaced about a circumference of the housing.

According to yet another aspect, the tapered recess and the tapered shank each have a taper angle of about 8 degrees relative to a central longitudinal axis thereof.

According to yet another aspect, the tool fastener comprises a set screw to be inserted through a threaded aperture formed in the adaptor to contact the proximate end of the tool while positioned within the adaptor. The threaded aperture formed in the adaptor can optionally be timed in approximately 90° increments about the adaptor from the second alignment portion.

According to another aspect, the present invention further includes a bit adaptor comprising a tapered shank to be received within the tapered recess defined by the housing in place of the adaptor and an aperture formed therein for receiving the proximate end of the tool, wherein the proximate end of the tool is secured within the aperture at an undefined angular orientation.

According to yet another aspect, the tool fastener comprises a set screw that contacts a generally planar region of the proximate end of the tool to secure the proximate end of the tool at a predetermined angle relative to the set screw within the aperture formed by the adaptor.

According to another aspect, the present invention further includes a housing-aligning portion for orienting the housing at a predetermined angular orientation relative to a chuck provided to the machine. The housing-aligning portion can optionally include a generally-planar region that is cooperable with a generally-planar region of the chuck to establish a predetermined angular relationship between the housing and the chuck. Alternately, the first alignment portion provided to the housing can optionally be timed approximately x degrees from the housing-aligning portion, wherein x is an integer selected from the group consisting of 0, 90, 180, and 270. Additionally, the tool fastener can optionally further include a set screw to be inserted through a threaded aperture formed in the adaptor to contact the proximate end of the tool while positioned within the adaptor. The threaded aperture formed in the adaptor can optionally be timed approximately y degrees about the adaptor from the second alignment portion, wherein y is an integer selected from the group consisting of 0, 90, 180, and 270.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 1:
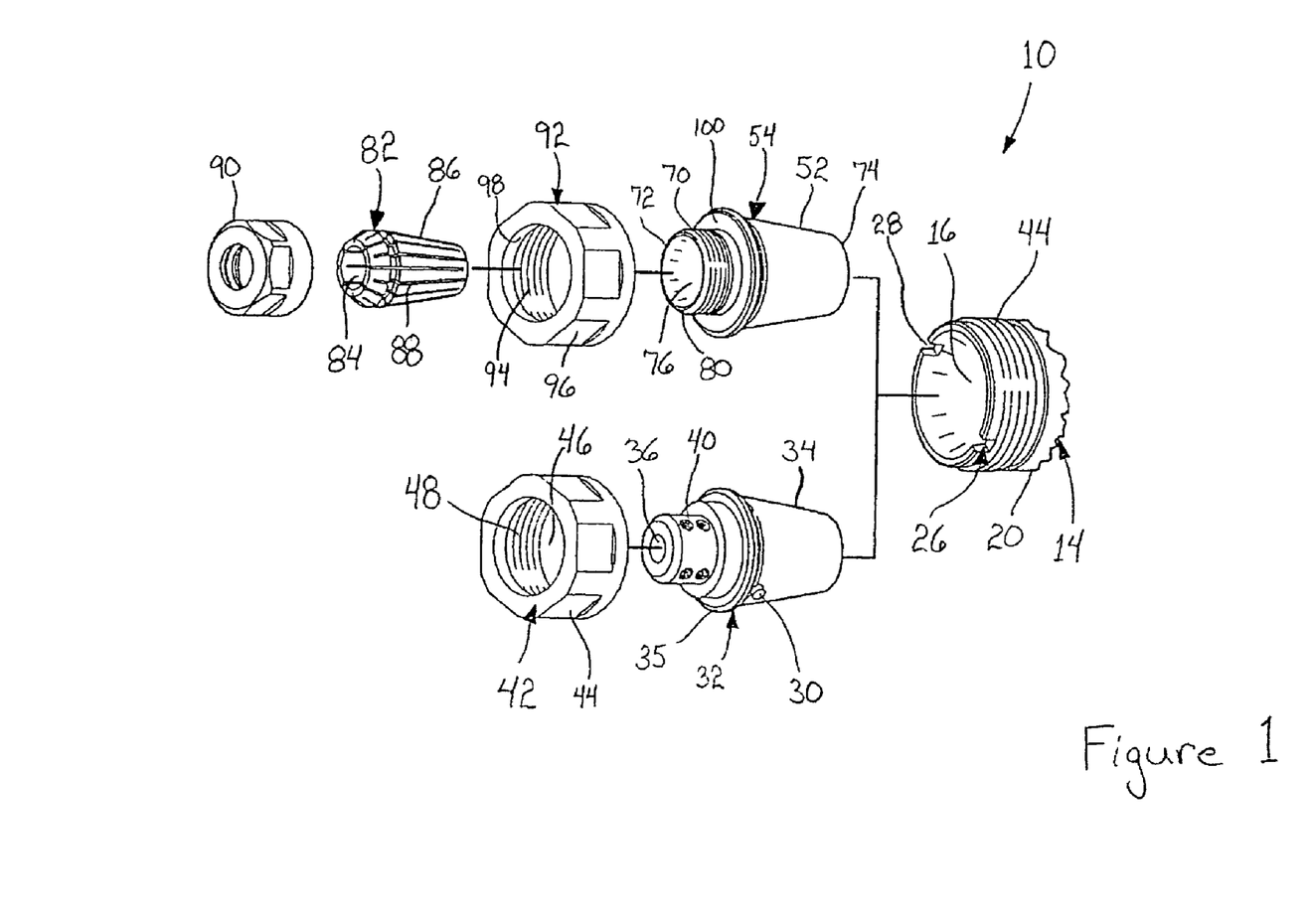
FIG. 1 is an exploded view of a centering tool-holding system according to an embodiment of the present invention.

A tool-holding system 10 for centering a tool 12 to be utilized by a machining instrument for machining a piece of material, referred to herein as a workpiece, from which a product is to be formed is shown in FIG. 1. The tool-holding system 10 comprises a housing 14 to be installed within a chuck of the machining instrument to allow for ready and accurate replacement of the tool 12 as needed without expending significant amounts of time. The housing 14, like other portions of the tool-holding system 10, can be fabricated from any metal, metal alloy, or any other suitably-strong material. Further, the housing 14 defines a tapered recess 16 which is configured to interchangeably receive two or more different tool holders that comply with a size standard for said tool holders. For example, a housing 14 that defines a tapered recess 16 that is sized in compliance with an ER standard (i.e., a taper degree of approximately 8°) can interchangeably receive a standard ER collet 82, a collet adaptor 54, and a centering adaptor 32, thus providing the machining instrument with the ability to accept different tools to be utilized in different ways. The tapered recess 16 can be thought of as a conical passage having an inside diameter that decreases while advancing into the tapered recess 16 along the axis 18. The inside diameter of the tapered recess 16 decreases along the axis 18 to form a taper angle of approximately eight degrees (8°) relative to the axis 18. Accordingly, if viewing a cross section of the tapered recess 16, an angle of approximately eight degrees (8°) would be formed between each side wall of the tapered recess 16 and a line parallel to the axis 18. The tapered recess 16 can be truncated short of a cone by a terminal wall (not shown), thus giving the tapered recess 16 a frusto-conical cross sectional appearance.

Figure 4:
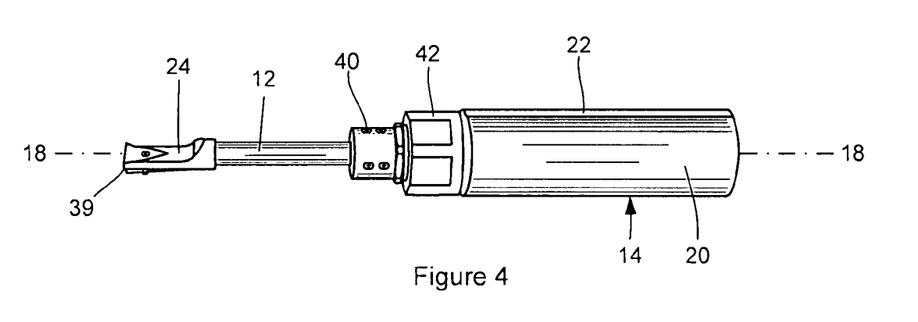
FIG. 4 is a side view of a tool-holding system in accordance with an embodiment of the present invention, wherein the cooperation between features for establishing a predetermined angular orientation of an adaptor relative to a housing is concealed by a fastener.
Figure 5:
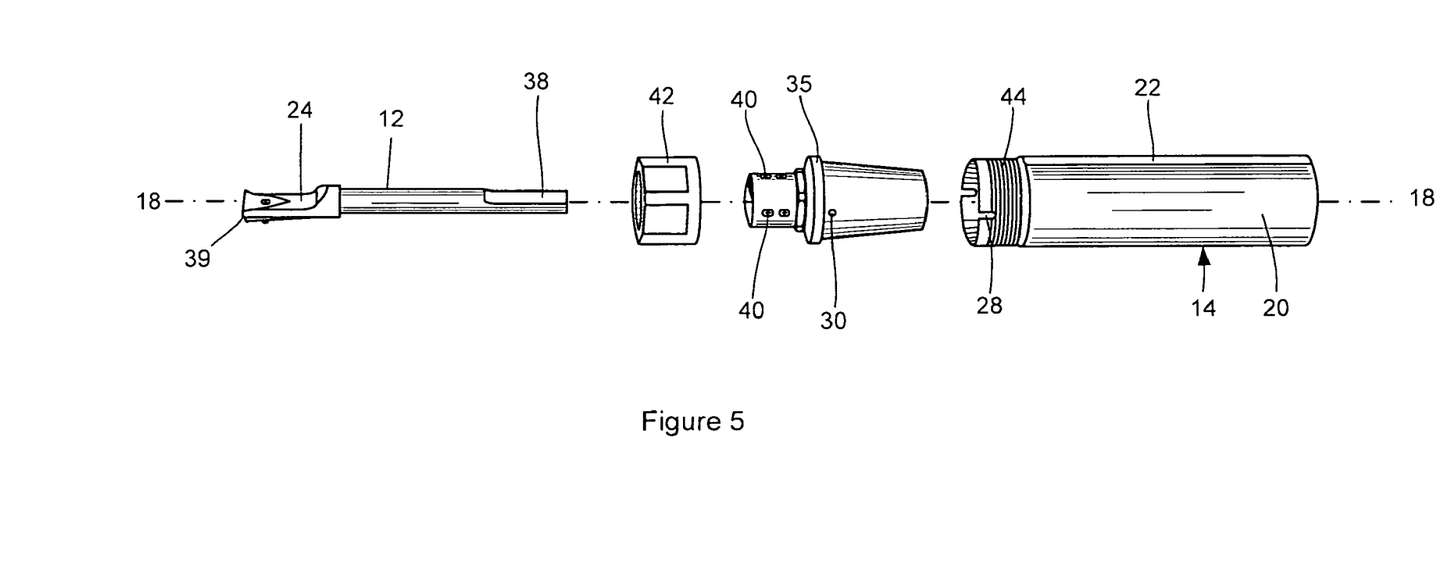
FIG. 5 is an exploded view of a tool-holding system in accordance with an aspect of the present invention.

The tool 12, shown best in FIG. 5, can be any generally-elongated material-working rod having a cutting tip 39 (FIGS. 3 and 4) or other material-working feature supported adjacent to a terminal end of the tool 12. A material working rod holds the cutting tip 39, which is the portion of the tool 12 that makes contact with, and acts on the workpiece. Other material-working features include threading tips, grooving tips, boring tips and the like. The cutting tip 39 makes contact with the workpiece during operation of the machining instrument to shape the workpiece as desired and form the end product therefrom. The tool 12 can also be equipped with a flat 38 formed adjacent to a proximate end of the tool 12 for cooperating with a compatibly-shaped flat about a periphery of an aperture 36 formed in the centering adaptor 32 as described in detail below.

The relationship between the flat 38 on the tool 12 and the angular orientation of the cutting tip 39 is fixed and known. Thus, when the tip 39 is to be positioned with a predetermined angular orientation about axis 18 in FIG. 5 relative to a workpiece to perform the desired machining operation thereon, the predetermined angular orientation can be achieved by establishing an appropriate angular orientation of the flat 38 about axis 18. As shown in FIG. 5, the angular orientation of the flat 38 approximately matches the angular orientation of the cutting tip 39 about axis 18. The flat 38, in this instance, can be oriented as desired about axis 18 to achieve the same orientation of the cutting tip 39. However, it is to be noted that the relationship between the orientation of the flat 38 on the tool 12 and the orientation of the cutting tip 39 can be any known, predetermined relationship.

Figure 3:
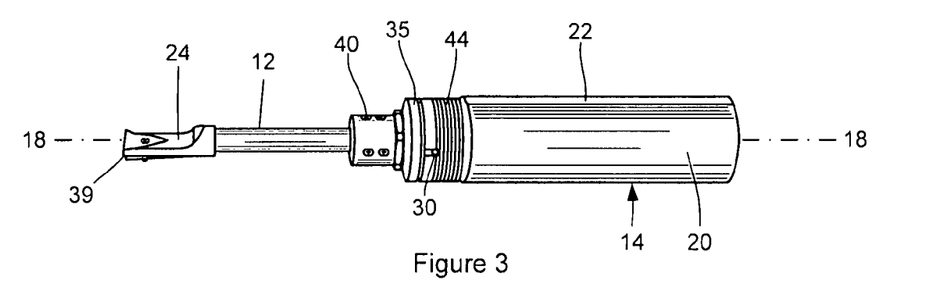
FIG. 3 is a side view of a tool-holding system in accordance with an embodiment of the present invention, wherein the cooperation between a male extension and a female aperture to establish a predetermined angular orientation of an adaptor relative to a housing is exposed.

The housing 14 has a generally-cylindrical exterior shape, with an exterior surface that extends substantially parallel to the longitudinal axis 18, shown best in FIGS. 3 and 4. The generally-cylindrical exterior surface of the housing 14 is referred to herein as a straight-shank portion 20 of the housing 14. The straight-shank portion 20 of the housing 14 is provided with one or more of a flat 22, spine, extension, aperture, or other aligning feature, or any combination thereof that can cooperate with compatible feature(s) provided adjacent to the terminal end of the machining instrument's chuck. The flat 22, or any other aligning feature(s) chosen according to sound engineering judgment, cooperates with the compatible feature provided to the chuck to minimize rotation of the housing 14 with respect to the chuck, a condition commonly referred to as slip.

Figure 2A:
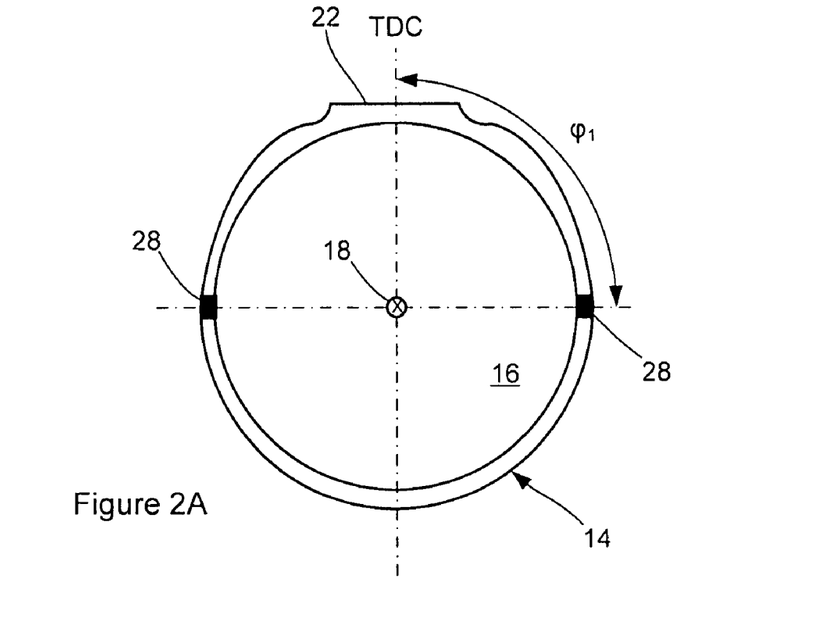
FIG. 2A is an end view of a housing for receiving a proximate end of a cutting tool.

The flat 22, or other aligning feature(s), also establishes a reference point from which the predetermined angular positions described in detail below can be measured. However, for the sake of clarity, and for adequately describing the present invention the reference position of the aligning feature on the housing 14, which in the examples described below is a single flat 22, will be referred to as top dead center ("TDC"), or a location corresponding to zero (0) degrees, as illustrated in FIG. 2A. FIG. 2A is a front view looking into the tapered recess 16 of the housing, and the flat 22 is oriented at TDC, which corresponds to a position of about twelve o'clock (12:00). But regardless of the particular angular orientation of the flat 22, the angular orientation of the cutting tip 39 coupled adjacent to the terminal end of the tool 12 by a tip clasp 24 can be determined relative to the flat 22 or other aligning feature provided to the housing 14.

A first alignment portion 26 is provided to the housing 14, said first alignment portion 26 being shown best in FIG. 1. In FIG. 1 the first alignment portion 26 is shown as a female feature, such as an aperture 28, also referred to as a notch, formed in the housing 14 adjacent to a periphery of an open end of the tapered recess 16. The aperture 28 is generally C-shaped, with the open end facing outwardly, generally out of the tapered recess 16. Formed in this manner, the aperture 28 can receive a locating pin 30 or other male feature extending from a centering adaptor 32 as the centering adaptor 32 is inserted into the tapered recess 16 along axis 18. When the centering adaptor 32 is fully inserted into the tapered recess 16, the locating pin 30 is disposed within the aperture 28 adjacent to the closed end thereof. The housing 14 can be provided with one or more first alignment portions 26 provided about the periphery of the tapered recess 16 at predetermined locations to guide the angular orientation of the adaptor 32 within the tapered recess 16 as described in detail below. The first alignment portion(s) 26, however, are provided to the housing 14 to cooperate with a second alignment portion provided to the centering adaptor 32 as described below without interfering with the interchanging of a collet adaptor 54, a collet 82, or both in place of the centering adaptor 32.

A second alignment portion, shown in FIG. 1 as including the locating pin 30, is provided to the centering adaptor 32 to cooperate with the first alignment portion 26 of the housing 14 while the centering adaptor 32 is at least partially disposed within the housing 14. While shown as a locating pin 30, the second alignment portion can include a male extension such as the locating pin 30, a female receptor, or a combination thereof, wherein a male member is provided at one location at the periphery of the tapered recess 16 and a female aperture is provided adjacent to another location at the periphery of the tapered recess 16. Further, there can be one or more of the features forming the second aligning portion, and embodiments of the present invention include a number of male members, female apertures, or a combination thereof equal to the number of first alignment portions 26 provided to the housing 14. Cooperation of the first and second alignment portions establishes a predetermined angular orientation of the centering adaptor 32 relative to the housing 14 while a tapered shank 34 of the centering adaptor 32 is at least partially inserted into the tapered recess 16.

For the embodiment shown in FIG. 1, cooperation of the first and second alignment portions is accomplished by inserting the at least one locating pin 30 into the at least one aperture 28 in a direction parallel to axis 18. With the locating pin 30 disposed within the aperture 28, rotation of the centering adaptor 32 relative to the housing 14 while disposed therein is minimized. Further, the aperture 28 can be timed a predetermined angle $\phi_1$ apart from the flat 22 to establish a predetermined angular orientation of the adaptor 32 relative to the housing 14, as shown in FIG. 2A. As shown, an aperture 28 is timed approximately 90° clockwise from the flat 22 about axis 18 (which is directed into the page), however, it should be noted that the aperture 28 can be timed any angle $\phi_1$ from approximately 0° to approximately 360° about the axis 18 from the flat 22. Specific examples include angles $\phi_1$ of approximately 0°, 90°, 180° and 360°, however, any $\phi_1$ angle falling within the range of approximately 0° to about 360° is within the scope of the present invention. Further, the embodiment shown in FIG. 2A includes an aperture 28 timed a predetermined angle $\phi_1$ each way, both clockwise and counterclockwise, about the axis 18.

The centering adaptor 32 is to be at least partially inserted into the tapered recess 16 for grasping the tool 12 and securing it to the chuck. Similar to the other portions of the tool-holding system 10, the adaptor 32 can be fabricated from any suitable metal or metal alloy, for example. Referring once again to FIG. 1, the centering adaptor 32 includes a tapered shank 34 that is to be received within the tapered recess 16 defined by the housing 14. The taper angle of the tapered shank 34 is approximately the same as the taper angle of the tapered recess 16, an angle of approximately eight degrees (8°) relative to the axis 18. A collar 35 extending outwardly from the centering adaptor 32 can be provided to limit the extent to which the tapered shank 34 can be inserted into the tapered recess 16, as shown in FIG. 3. At the full insertion point, the collar 35 contacts the periphery of the entrance to the tapered recess 16, prohibiting further insertion of the centering adaptor 32 into the tapered recess 16 along axis 18.

With the tool 12 fully inserted within the centering adaptor 32 as described in detail below, the distal end 24 of the tool 12 extends a distance out of the centering adaptor 32 beyond the collar 35 and other features of the centering adaptor 32. This distance can be a known predetermined distance based on the length of the tool 12, or can be measured to determine the extent to which the tool 12 extends outwardly of the centering adaptor 32 before the centering adaptor is installed in the chuck, possibly while the machining instrument is operating with a different tool. The tool 12 is to be secured within the centering adaptor 32 prior to its installation in the chuck. And when the centering adaptor 32 is installed in the chuck, the distance to which the tool 12 extends beyond the centering adaptor 32 is known. Thus, the distance that will exist between the cutting tip 39 and the chuck when the centering adaptor 32 is installed therein can be accurately determined without requiring the operator to slowly jog the cutting tip 39 to the workpiece in the machining instrument after the centering adaptor 32 has been installed. Instead, this distance can be manually entered by an operator into a CNC or other computer that controls the machining instrument to ensure proper machining of the workpiece and minimize damage to the machining instrument.

Figure 2B:
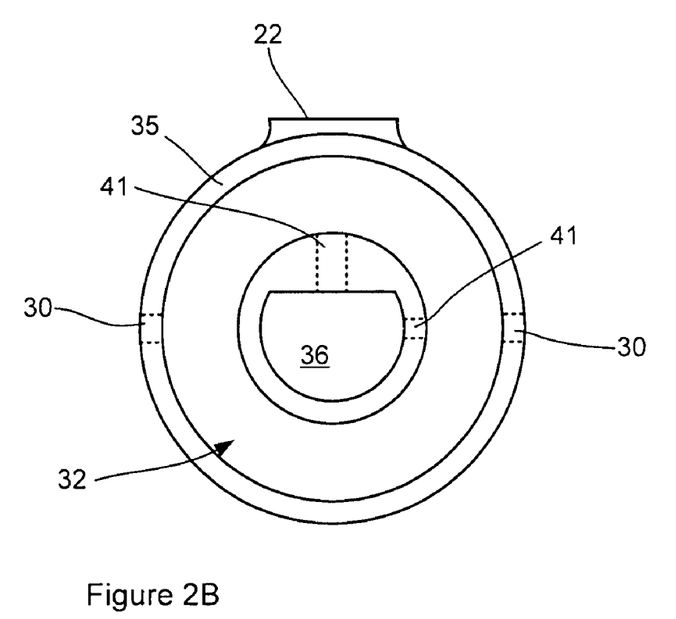
FIG. 2B is an end view of an adaptor disposed within a housing according to an embodiment of the present invention for receiving a proximate end of a cutting tool.

At an end of the centering adaptor 32 opposite the tapered shank 34 is an aperture 36 for receiving a proximate end of the tool 12. The proximate end of the tool 12 is generally cylindrical, and fabricated from a suitable metal or metal alloy to withstand the forces imparted thereon during machining operations. One or more flats 38 can optionally be formed on the proximate end of the tool 12 extending along the longitudinal axis 18, as shown in FIG. 5. According to an illustrative embodiment of the present invention, the tool can include any number of flats 38 to be inserted into a centering adaptor 32 provided with an equal number of flats provided to the periphery of the aperture 36. A tool fastener such as a set screw 40 cooperates with the flat 38 and secures the proximate end of the tool 12 within the aperture 36 at a predetermined angular position therein. The one or more set screws 40 can be threaded into a threaded passage 41 (shown by hidden lines in FIG. 2B) formed in the centering adaptor 32 to contact the flat 38 when the proximate end of the tool 12 is disposed within the aperture 36. Tightening the one or more set screws 40 applies a force of sufficient magnitude to force the planar surface of the flat 38 to be oriented generally perpendicular to the longitudinal axis of the set screws 40, thereby securing the tool at the predetermined angular position within the centering adaptor 32.

As previously mentioned, the tool 12 is fabricated with a known relationship between the orientation of the flat 38, or other tool-orienting feature such as a rib, for example, and the cutting tip 39 (FIGS. 3-4) to be supported adjacent to the distal end 24 of the tool 12. Thus, a given angular orientation of the flat 38 about the axis 18 will produce a predictable angular orientation of the cutting tip 39 about axis 18. Further, the flat 38 is formed adjacent to the proximate end of the tool 12 to properly position the cutting tip 39 to perform a desired machining operation. For example, the tool 12 can be fabricated such that it holds the cutting tip 39 in a plane that is generally parallel to a plane in which the flat 38 is maintained. Optionally, the flat 38 and the cutting tip can be located in the same plane. Other embodiments include a cutting tip held by the tool 12 in a plane perpendicular to a plane of the flat 38, or at any other angular orientation relative to the plane of the flat 38.

A fastener 42, shown in FIG. 1, can be provided for securing the centering adaptor 32 within the tapered recess 16 of the housing 14 at the desired orientation about axis 18. The fastener 42 can be any threaded or otherwise releasable fastener that is compatible with a portion of the housing 14 to secure the centering adaptor 32 within the tapered recess 16. For example, the housing 14 is provided with external threads 44 that encircle the periphery of the tapered recess 16. The fastener 42 is a nut including a plurality of facets 44 arranged on the exterior of the nut to permit the use of a wrench or other gripping tool to rotate the fastener 42 when rotation of the fastener 42 by hand becomes difficult. An aperture 46 is formed in the fastener, and sized to permit passage of the portion of the centering adaptor 32 defining the aperture 36. However, the collar 35 formed about the centering adaptor 32 has an external diameter that is larger than the diameter of the aperture 46 formed in the fastener 42. Thus, the fastener 42 can be slid over the portion of the centering adaptor 32 defining the aperture 36 such that the portion of the centering adaptor 32 defining the aperture 36 extends through the aperture 46. As the fastener 42 is slid over that portion of the centering adaptor 32 along axis 18, an internal surface of the fastener 42 eventually makes contact with a surface of the collar 35, thereby limiting the extent to which the fastener 42 can be slid over the centering adaptor 32. Internal threads 48 within the cavity of the fastener threadedly engage the external threads 44 of the housing 14 to secure the fastener 42 to the housing 14. Rotation of the fastener in a first direction about the axis 18 cause the threads to guide the fastener 42 along the housing 14, thereby imparting a force on the collar 35 and urging the centering adaptor 32 into the tapered recess 16.

In use, the tool-holding system 10 of the present invention allows for the rapid attachment and removal of a tool 12 to and from a machining instrument. Further, installation of the tool 12 with the tool-holding system 10 substantially centers the tool 12 such that the cutting tip 39 supported thereby has a predetermined angular orientation desired for a particular machining operation. In general, the angular orientation of the housing 14 relative to the chuck of the machining instrument is established and fixed by the interaction of the flat 22 on the housing 14 and a compatible flat portion of the chuck provided to the machining instrument to hold the housing 14. The locating pin 30 of the centering adaptor 32 is aligned with, and inserted into the notch 28 as the tapered shank 34 of the centering adaptor 32 is inserted into the tapered recess 16 of the housing 14. With the locating pin 30 inserted into the notch 28, the angular orientation of the centering adaptor 32 within the tapered recess 16 is known. Accordingly, since the angular orientation of the tool 12 within the aperture 36 of the centering adaptor 32 is also known and held in place by the set screw 40 or other tool fastener, the angular orientation of the tool 12 relative to the housing 14 can be determined.

An example of a method of coupling the tool 12 to a machining instrument is presented below in detail. This example will be described with an embodiment of the tool-holding system 10 comprising a centering adaptor 32 that includes one or more locating pins 30, wherein each locating pin 30 is timed 180° apart from the other about a central axis 18 of the centering adaptor 32. In other words, for an embodiment with two locating pins 30, the locating pins 30 extend from a surface of the centering adaptor 32 in different directions generally away from the centering adaptor 32 on opposite sides thereof, shown by hidden lines in FIG. 2B. Accordingly, the housing 14 of this example also includes two similarly-aligned notches 28 as the first alignment portions 26, as shown in FIG. 1, that will each receive a respective locating pin 30 of the centering adaptor 32. The housing 14 is also provided with a flat 22 timed 90° about axis 18 from the notches 28. Further, in the present example, the tool fastener, which is in the form of a pair of set screws 40, is timed 90° about the central axis 18 from the locating pins 30 to secure the a proximate end of the tool 12 within the aperture 36 of the centering adaptor 32.

The tool 12 to be coupled to the machining instrument of the present example is provided with a flat 38 (FIG. 5) formed on a proximate end of the tool 12. The proximate end of the tool 12 is inserted into the aperture 36 of the centering adaptor 32 and oriented such that the planar surface of the flat 38 is approximately perpendicular to a direction in which the set screws 40 are inserted into the centering adaptor 32. A cutting tip 39 is supported adjacent to a terminal end of the tool 12, and is substantially parallel to the plane of the flat 38 at the proximate end of the tool 12. Thus, when the planar surface of the flat 38 is oriented horizontally, so is a leading edge of the cutting tip 39.

Figure 2C:
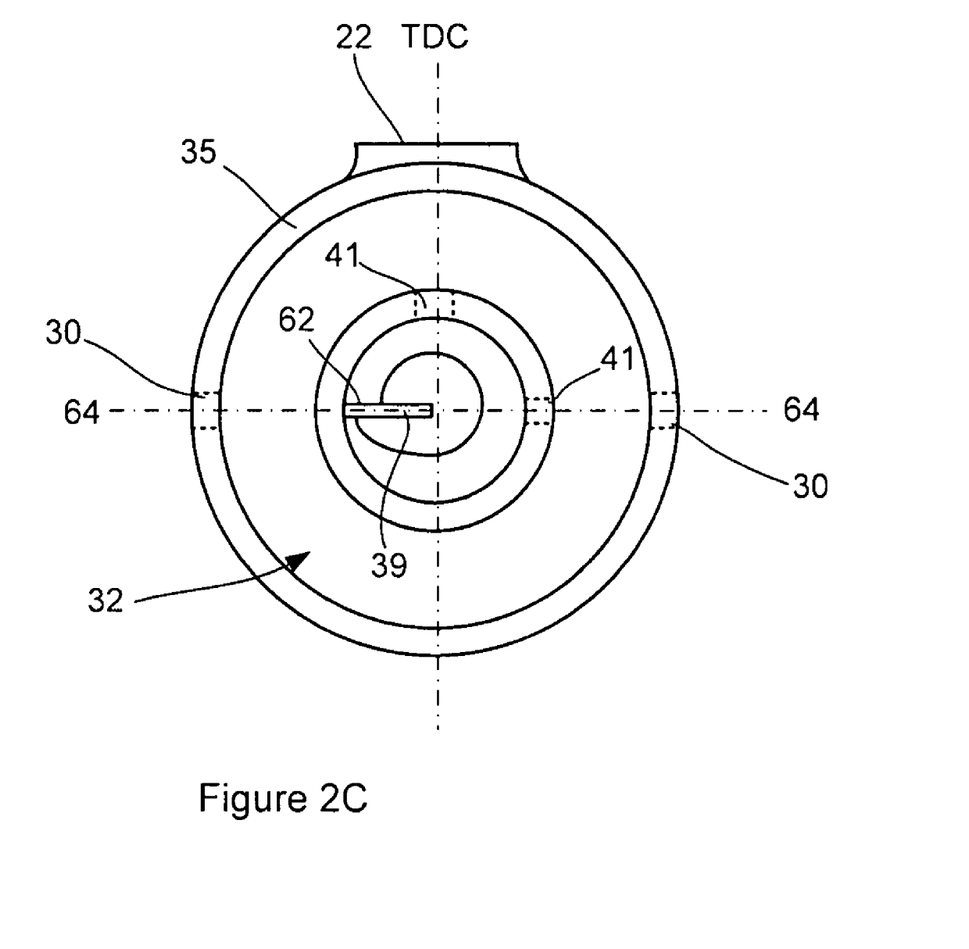
FIG. 2C is an end view of a cutting tip provided to a cutting tool disposed within a tool-holding system in accordance with an embodiment of the present invention.

Centering of the tool 12 to achieve a desired orientation of the cutting tip 39 is best understood with reference to FIG. 2C, which is an end view looking toward the cutting tip 39. In the present example, the cutting tip 39 of the tool 12 is to be centered by positioning the cutting tip 39 such that its elongated leading edge 62 is oriented horizontally, an orientation that is indicated by the dashed line 64, said dashed line 64 having an angular orientation timed approximately 90° from the TDC position. However, it should be noted that the present invention, in conjunction with compatible tools, can be adapted to center the tool 12 to provide the leading edge 62 of the cutting tip 39 with any predetermined orientation about the axis 18 relative to a surface of a workpiece to be machined by the tool 12 for a given machining operation. For the example in FIG. 2C, it is desired to orient the leading edge 62 of the cutting tip 39 to be substantially horizontal.

To center and couple the tool 12 to the chuck of a machining instrument, the housing 14 is received within the chuck such that the flat 22 on the housing 14 is aligned with a similarly-sized flat formed in the chuck. The chuck is merely a cavity in which the housing 14 can be inserted to couple the tool 12 to the machining instrument. The chuck can be a sole receptacle, or one of several receptacles supported about the periphery of a turret that can rotate to properly position a plurality of tools to be used during a given machining operation. Since the flat 22 on the housing 14 protrudes slightly from the surface of the straight-shank portion 20 of the housing 14, slippage of the housing 14 within the chuck is minimized. A clamp, screw, bolt, or any other suitable fastener can be used to secure the housing 14 within the chuck.

The tool 12 to be coupled to the machining instrument is inserted, proximate end first, into the aperture 36 formed in the centering adaptor 32. The flat 38 formed on the proximate end of the tool 12 is roughly oriented to face an internally-threaded aperture into which the set screws 40 are to be inserted. Alignment of the flat 38 relative to the apertures where the set screws 40 are to be inserted does not need to be perfect such that the planar surface of the flat 38 is exactly perpendicular to the set screws 40. The force exerted on the planar surface of the flat 38 by the set screws 40 as they are inserted into the centering adaptor 32 will provide fine adjustment to the orientation of the flat 38.

Once the proximate end of the tool 12 has been inserted into the aperture 36 of the centering adaptor 32, the set screws 40 are threadedly inserted into internally-threaded passages extending into the centering adaptor 32. Upon clearing the interior periphery of the centering adaptor 32, the set screws 40 contact the flat 38 on the proximate end of the tool 12. Continuing to insert the set screws 40 will apply a force on the flat 38, thereby orienting the planar surface of the flat 38 to be approximately perpendicular to the direction in which the set screws 40 are inserted into the centering adaptor 32. For the present example, the leading edge 62 of the cutting tip 39 is also oriented approximately parallel to the planar surface of the flat 38 on the proximate end of the tool 12.

The assembled module comprising the tool 12, centering adaptor 32 and set screws 40 is inserted into the tapered recess 16 of the housing 14. The modular nature of this assembled module suits it well for allowing rapid replacement of the tool 12. The tapered shank 34 has an external taper angle relative to the central axis 18 that is the approximate complement of the internal taper angle of the tapered recess 16 relative to the axis 18. The assembled module is rotated until each locating pin 30 is aligned with its respective notch 28 formed adjacent to the periphery of the tapered recess 16. Since the tool 12 has a fixed angular orientation relative to the centering adaptor 32, rotation of the centering adaptor 32 also causes rotation of the tool 12, and accordingly, the leading edge 62 of the cutting tip 39. Once the locating pins 30 are properly aligned with their respective notches 28, the assembled module can be fully inserted into the tapered recess 16. Fully inserted, the tapered shank 34 of the adaptor is snugly received within the tapered recess 16 and the one or more locating pins 30 are each disposed within their respective notches 28. Although a hermetic seal between the tapered shank 34 and the interior of the tapered recess 16 is not absolutely required to constitute a snug relationship, the centering adaptor 32 is sized to minimize spaces between the centering adaptor 32 and the tapered recess 16 while the adaptor 32 is disposed within the tapered recess 16. The similarity between the degree to which the tapered shank 34 is tapered and that of the interior of the tapered recess 16 causes a wedge-like relationship between the centering adaptor 32 and the tapered recess 16.

Due to the alignment of the locating pins 30 with the notches 28, the angular orientation of the leading edge 62 of the cutting tip 39 is known. For instance, in the present example, the two notches 28 are timed 90° in each direction (i.e., clockwise and counterclockwise) about axis 18 from the flat 22 provided to the housing 14. For reference, the flat 22 of the housing 14 is considered to be located at the TDC position (i.e., 12 o'clock in FIG. 2A). Further, the set screws 40, which indicate a direction perpendicular to the planar surface of the flat 38 provided to the proximate end of the tool 12 secured within the centering adaptor 32, are timed 90° about the axis 18 from each locating pin 30. In other words, the set screws 40 are 90° in one direction (i.e., clockwise) about the axis 18 from the locating pin 30.

When the locating pin 30 is disposed within the notch 28, the set screws 40 are also timed 90° about the axis 18 from the notch 28, corresponding to the angular orientation of the flat 22 on the housing 14. Thus, in the present example, the set screws 40 are approximately aligned at the same angular orientation as the flat 22 on the housing 14, which is TDC position, when the centering adaptor 32 is properly inserted into the tapered recess 16. This causes the planar surface of the flat 38, and accordingly, the leading edge 62 of the cutting tip 39 to be oriented substantially horizontal, thereby centering the tool 12.

The fastener 42 can be placed over the tool 12 and a portion of the centering adaptor 32 until an internal flange of the fastener 42 reaches the collar 35 of the centering adaptor 32. Cooperation between the internal threads 48 of the fastener 42 and external threads 44 formed on the housing 14 adjusts the fastener further towards the housing, thereby imparting a force parallel to the axis 18 on the collar 35 of the centering adaptor 32. The force imparted on the collar 35 urges the centering adaptor 32 into the tapered recess 16 and the interior taper of the tapered recess 16 centers the tapered shank 34 therein. Thus, when the centering adaptor 32 is fully inserted, a wedge-like relationship is established between the tapered shank 34 and the tapered recess 16, resulting in proper seating of the centering adaptor 32 at the approximate center of the tapered recess 16.

The above example discusses a particular quantity and arrangement of notches 28, locating pins 30, flats 22 and 38, and the like. However, it should be noted that the number and particular location of each of said features is to be chosen with sound engineering judgment to establish the desired orientation of the cutting tip 39. For instance, the flat 22 on the housing 14 does not necessarily have to be located at the TDC position. Any angular orientation of the flat 22 about axis 18 is also within the scope of the present invention. Likewise, the scope of the present invention also includes any number and location of locating pins 30 or other second alignment portions provided to the centering adaptor 32, and any number and location of notch 28 or other first alignment portion 14 provided to the housing 14.

Also, the example embodiments discussed above included female first alignment portions in the form of notches 28, and male second alignment portions in the form of locating pins 30. However, it should be noted that other embodiments of the present invention can optionally include any combination of male and female first and second alignment portions so long as the first and second alignment portions cooperate to establish an angular orientation of the centering adaptor 32 relative to the housing 14.

Due in part to the physical similarities between the tapered shank 34 and a shank 52 of a collet adaptor 54 shown in FIG. 1, the tool-holding system 10 can interchangeably secure a symmetrical tool, such as a drill bit (not shown), having a cylindrical proximate end and a tool, and a tool 12 such as a boring tool, having a proximate end with a flat 38. As such, the tool-holding system 10 can optionally include an interchangeable collet adaptor 54 that can be received within the tapered recess 16 in place of the centering adaptor 32.

The collet adaptor 54 comprises a tapered exterior shank 52 that closely approximates the interior dimensions of the tapered recess 16 is provided to fit snugly within the tapered recess 16 of the housing 14. Similar to the tapered shank 34 of the centering adaptor 32, the tapered shank 52 is to be snugly received within the tapered recess 16. As with the other portions of the tool-holding system 10, the collet adaptor 54 is fabricated from a metal or metal alloy that can withstand the forces imparted thereon during machining operations. Embodiments of the present invention include a collet adaptor 54 that is forged from molten metal or metal alloy as a monolithic unit.

The tapered shank 52 of the collet adaptor 54 is tapered to decrease along its length (i.e., along central axis 18) from an externally-threaded portion 70 adjacent to a leading edge 72 of the collet adaptor 54 towards a distal end 74 that is to be inserted into the tapered recess 16. Again, the tapered shank 52 can have any degree of taper suitable for being snugly inserted into the tapered recess 16. But regardless of the specific taper chosen, the taper angle of the tapered shank 52 approximates the taper angle of the tapered recess 16. For embodiments where the taper angle of the tapered recess 16 is eight degrees (8°) relative to the central axis 18, the taper angle of the tapered shank 52 is also approximately eight degrees (8°), which is a taper angle that is consistent with an ER-standard collet to be received within an ER chuck suitable for receiving ER series collets such as those manufactured by Parlec, Inc. But regardless of the standard to which the tapered recess 16 conforms, the tapered shank 54 and the tapered recess 16 both conform to the same standard. In other words, if the tapered recess 16 is an ER standard recess (i.e., a recess having a taper angle of approximately 8° and dimensioned to receive an ER series collet), then the tapered shank 54 has dimensions that are the same as, or similar to the ER collet designed to be received within that ER standard recess. The tapered recess 16 and the tapered shank 52, as well as the tapered shank 34 of the centering adaptor 32, are the same style, or they are styles that compatibly similar to each other.

Like the centering adaptor 32, the collet adaptor 54 is to be snugly inserted into the tapered recess 16 when releasably securing a symmetrical tool such as a drill bit to the machining instrument. Although a hermetic seal between the tapered shank 52 and the interior of the tapered recess 16 is not absolutely required to constitute a snug relationship, the collet adaptor 54 is sized to minimize spaces between the collet adaptor 54 and the tapered recess 16 when installed therein. The similarity between the degree to which the tapered shank 52 is tapered and that of the interior of the tapered recess 16 causes a wedge-like relationship between the collet adaptor 54 and the tapered recess 16. The tapered shank 52 of the collet adaptor 54 has approximately the same dimensions as the tapered shank 34 of the centering adaptor 32 to allow the adaptor 32 and the collet adaptor 54 to be interchangeable within the tapered recess 16 defined by the housing 14. The collet adaptor 54, unlike the centering adaptor 32, lacks locating pins 30 and any other alignment portion that establishes a predetermined angular orientation of the collet adaptor 54 relative to the housing 14 when disposed within the tapered recess 16. A force parallel to axis 18 that is applied to the collet adaptor 54 and that urges the collet adaptor 54 into the tapered recess 16 will result in a centering force applied by the interior of the tapered recess 16 to the tapered shank 52. Thus, when the collet adaptor 54 is fully inserted, a wedge-like relationship will be established between the collet adaptor 54 and the tapered recess 16, resulting in proper seating of the collet adaptor 54 at the approximate center of the tapered recess 16.

The collet adaptor 54 defines a secondary interior tapered recess 76 and comprises an exterior threaded portion 70 about a leading edge 80 of the collet adaptor 54. Like the tapered recess 16, the secondary tapered recess 76 is also generally cylindrical in shape, and has an inside diameter that decreases along its length from the leading edge 80 progressing towards an innermost terminal wall of the secondary tapered recess 76. Although any degree of taper suitable for receiving a collet is within the scope of the secondary tapered recess 76 of the present invention, the taper angle can be of any degree, such as 8 degrees relative to the central axis 18 of the secondary tapered recess 76, which corresponds to a standard ER recess, for example, that is suitable for receiving ER series collets such as those manufactured by Parlec, Inc. The external threaded portion 70 provided adjacent to the aperture 36 leading into the secondary tapered recess 76 to cooperate with complimentary threads 38 of an end cap 40, which can be any threaded fastener such as a nut, for example, for securing at least a portion of a collet 42 within the secondary tapered recess 30.

Thus, an embodiment of the collet adaptor 54 is considered to be an ER-to-ER adaptor with a tapered shank 52 having a taper angle of approximately eight degrees (8°) relative to the central axis 18 (i.e., an external taper angle that complies with the ER standard) and a secondary tapered recess 76 with an internal taper angle of approximately 8° relative to axis 18 (i.e., an interior taper angle that also complies with the ER standard). The tapered shank 54 can be snugly received within an ER-standard tapered recess 16 while the secondary tapered recess 76 can receive an ER, or other standard-size collet 82 snugly therein without requiring any other members to be disposed between the ER collet 82 and the secondary tapered recess 76.

A collet 82 defines an interior passage 84 and is elastically deformable to constrict the base portion of the symmetrical tool disposed within that interior passage 84. The collet 82 is a precisely-machined sleeve formed from a metal or metal alloy that defines an essentially-tubular interior passage 84 having an inside diameter that is slightly larger than the outside diameter of the base portion of the tool 12 which it is adapted to receive. The exterior surface of the collet 82 includes a tapered or frusto-conical shaped portion 86, which is shaped to be inserted into a mating, tapered or frusto-conical recess, such as the secondary tapered recess 76 for example, extending slightly out of the recess in which it is to be inserted. A plurality of longitudinal slots 88 are machined into the exterior surface of the collet 82 to allow the inner diameter of the collet 82 to decrease radially and create a grasping action on the base portion of the symmetrical tool inserted into the interior passage 84 of the collet 82. One or more of these slots 88 can originate at a terminal end of the collet 82, extend longitudinally along axis 18 through the collet 82, and optionally terminate short of reaching the opposite terminal end of the collet 82. Optionally, one or more of the slots 88 can extend depthwise entirely through the collet wall in which they are machined, the slots can extend only partially through the collet wall in which they are machined, or a combination thereof. Alternate embodiments include slots 88 having an alternating pattern as shown in FIG. 1, wherein every other slot 88 in a first set originates at the same terminal end, and terminates short of the longitudinally-opposing terminal end. The other set of slots 88 originates from the opposite terminal end of the collet 82 and terminates short of the terminal end that the first set of slots 88 originated from.

The gripping action of the collet 82 is effected by the inward wedging of the fingers of the collet 82 formed between the slots 88 into the secondary tapered recess 76 of the collet adaptor 54. The axial movement of the collet 82 along axis 18 with respect to the secondary tapered recess 76, and consequently the radial movement of the fingers, is effected by an end cap 90 being rotationally secured to the externally-threaded portion 70 of the collet adaptor 54. Thus, the force applied to the collet 82 urging it into the secondary tapered recess 76 causes the fingers to wedge against the internal walls of the secondary tapered recess 76. This wedging action causes the collet 82 to elastically deform and constrict the base portion of the symmetrical tool that is placed within the internal passage 84 defined by the collet 82.

The ER collet 82 received within the secondary tapered recess 76 can have external dimensions, i.e., the tapered portion 86 of the collet 82 has a taper angle that complies with the same ER size classification as the tapered shank 54, or one or more ER size classifications smaller than the tapered shank 54. Thus, the taper angle of the tapered shank 52 is approximately eight degrees (8°), but the outside diameter of the ER collet 82 can be approximately the same, or smaller different than the outside diameter of the tapered shank 52 of the collet adaptor 54 in which the collet 82 is to be received. In this manner, the collet adaptor 54 can be thought of as an interface between the tapered recess 16 and a collet 82 with the same ER classification as the tapered recess 16, or that is optionally one or more ER size classifications smaller than the ER size classification of the tapered recess 16. The tapered shank 54 and the secondary tapered recess 76 have a taper angle that both comply with the same standard.

According to alternate embodiments of the present invention, the ER collet 82 can be interchangeably received directly within the tapered recess 16 in place of the collet adaptor 54 and the centering adaptor 32 since the external dimensions of the collet 82 also comply with the ER standard. Each of the collet adaptor 54, the centering adaptor 32 and the collet 82 can be chosen to comply to the same taper standard to allow for the interchangability of these features within the tapered recess 16 without requiring different housings 14.

A nut 92 or other releasable fastener is provided to retain the collet adaptor 54 within the tapered recess 16. The nut 92 is a releasable fastener that comprises an internally threaded portion 94 that is cooperable with external threads 44 provided adjacent to the tapered recess 16 to secure the collet adaptor 54 therein. The nut-shaped exterior includes facets 96 that can be gripped by a wrench or other such instrument that provides a mechanical advantage to tighten and loosen the nut 92. An inward-extending flange 98 abuts against an outward-extending collar 100 of the collet adaptor 54 when the nut 92 is slid over the external threaded portion 70 and generally toward the threads 44 adjacent to the tapered recess 16.

For the sake of clearly describing various illustrative embodiments of the present invention, references have been made above to a centering adaptor 32 for use in coupling a cutting tool to a chuck of a machine. However, it should be noted that the centering adaptor 32 can be used to couple any type of tool requiring a predetermined angular orientation for a desired machining operation, not just boring tools, to any machining instrument. Additionally, the collet 82 and collet adaptor 54 can also be used to couple any type of tool having a generally-cylindrical shank to the machining instrument. Examples of such tools include drill bits, lathe bits, and the like. Accordingly, the machining instrument can be any type of material machining device such as a lathe, milling machine, drill, etc. . . .

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A tool-holding system configured to interchangeably receive a standard ER collet and a centering adaptor and used for centering a cutting tool in a machine, the tool-holding system comprising:
    a housing having a first alignment portion and defining a tapered recess that is sized and shaped to interchangeably receive a standard ER collet and a centering adaptor, and is to be provided to the machine for receiving at least a portion of a centering adaptor; said centering adaptor having a tapered exterior portion comprising a shank that has a tapered exterior and is to be received within the tapered recess defined by the housing, the adaptor comprising:
    an aperture formed in the adaptor for receiving a proximate end of the tool, wherein a portion of the aperture is configured to correspond with a portion of the proximate end of the tool such that the cooperation of the portions positions the tool inside the aperture in a predetermined angular orientation and maintains the predetermined angular orientation of the tool within the aperture before the proximate end of the tool is secured; and a tool fastener for securing the proximate end of the tool within the aperture at the predetermined angular orientation therein;
    a second alignment portion provided to the adaptor to cooperate with the first alignment portion to establish a predetermined angular orientation of the adaptor relative to the housing while the shank of the adaptor is at least partially inserted into the tapered recess; and a fastener for securing the adaptor within the tapered recess of the housing.

2. The tool-holding system according to claim 1 further comprising a set of threads about an exterior surface of the housing for releasably receiving the fastener for securing the adaptor.

3. The tool-holding system according to claim 1, wherein the first alignment portion comprises at least one aperture formed in the housing adjacent to an open end of the tapered recess, and wherein the second alignment portion comprises at least one releasable male extension located on the adaptor and extending outwardly generally-away from the adaptor.

4. The tool-holding system according to claim 1, wherein the tool fastener comprises a set screw to be inserted through an aperture formed in the adaptor to contact a region of the proximate end of the tool to secure the proximate end of the tool at a predetermined angle relative to the set screw within the aperture formed by the adaptor.

5. The tool-holding system according to claim 4, wherein the threaded aperture formed in the adaptor is timed in approximately 90° increments about the adaptor from the second alignment portion.

6. The tool-holding system according to claim 1 further comprising a bit adaptor comprising a tapered shank to be received within the tapered recess defined by the housing in place of the adaptor and an aperture formed therein for receiving the proximate end of the tool, wherein the proximate end of the tool is secured within the aperture at an undefined angular orientation.

7. The tool-holding system according to claim 1 further comprising a housing-aligning portion for orienting the housing at a predetermined angular orientation relative to a chuck provided to the machine.

8. The tool-holding system according to claim 7, wherein the housing-aligning portion comprises a generally planar region that is cooperable with a generally-planar region of the chuck to establish a predetermined angular relationship between the housing and the chuck.

9. The tool holding system according to claim 1, wherein the tapered exterior portion of the adaptor is sized and shaped to correspond to that of an ER collet and selected from a group of ER sizes consisting of ER-11, ER-16, ER-20, ER-25, ER-32 and ER-40.

10. A tool-holding system for centering a cutting tool in a machine, the tool-holding system comprising:
a housing defining a tapered recess to be provided to the machine for receiving at least a portion of the cutting tool;
an adaptor having a tapered shank that is to be received within the tapered recess defined by the housing, wherein the tapered shank of the adapter is sized and shaped to correspond to that of an ER collet, the adapter comprising
an aperture for receiving a proximate end of the tool, wherein the aperture includes at least one flat portion and the proximate end of the tool includes at least one flat portion, wherein the cooperation of the flat portions positions the tool inside the aperture in a predetermined angular orientation and maintains the predetermined angular orientation of the tool within the aperture before the proximate end of the tool is secured; and means for securing the proximate end of the tool within the aperture at the predetermined angular position therein relative to the adaptor;
means for establishing a predetermined angular orientation of the adaptor relative to the housing while the adaptor is received within the tapered recess defined by the housing; and a fastener for securing the adaptor within the tapered recess of the housing.

11. The tool-holding system according to claim 10, wherein the means for securing the proximate end of the tool within the aperture and the means for establishing a predetermined angular orientation of the adaptor are arranged to provide a cutting tip with a predetermined angular orientation.

12. The tool-holding system according to claim 10, wherein the means for securing the proximate end of the tool within the aperture comprises a set screw to be inserted into a threaded aperture formed in the adaptor.

13. The tool-holding system according to claim 10, wherein the means for establishing a predetermined angular orientation of the adaptor relative to the housing comprises:
a locating pin located on the tapered shank and extending generally outwardly away from the adaptor; and
an aperture formed in the housing for receiving the locating pin to provide the adaptor a predetermined angular orientation within the tapered recess of the housing while disposed at least partially therein.

14. The tool holding system according to claim 10, wherein the tapered shank of the adaptor is sized and shaped to correspond to that of an ER collet and selected from a group of ER sizes consisting of ER-11, ER-16, ER-20, ER-25, ER-32 and ER-40.

15. A quick change tool holder configured to interchangeably receive a standard ER collet and a centering adaptor for centering a tool at a predetermined angular orientation relative to a workpiece comprising:
a tool having a distal cutting region and a proximal securing region, the securing region being distal to the proximate end and having an external diameter with a configuration designed for selectively mating within an aperture; and
an adaptor having a tapered exterior comprising a shank that has a taper angle of a standard ER collet and an aperture with an internal diameter that has a configuration complimentary to the configuration of the securing region of the tool such that the proximate region of the tool may be selectively inserted within the aperture, wherein when the configurations are mated the tool is caused to be centered within the adaptor and restricted from rotating about a longitudinal axis relative to the adaptor.

16. The quick change tool holder for centering a tool at a predetermined angular orientation relative to a workpiece according to claim 15 wherein the adaptor further comprises at least one aligning portion sized and shaped to be mated with an at least one first aligning portion of a housing, such that when the aligning portion of the adaptor and the first aligning portion of the housing are mated, the tool is centered relative to the housing.

17. The quick change tool holder for centering a tool at a predetermined angular orientation relative to a workpiece according to claim 16 wherein the housing is sized and shaped to interchangeably receive a standard ER collet, a collet adaptor, and a centering adaptor and further comprises at least one second aligning portion that is sized and shaped to be mated with an at least one aligning portion of a chuck, such that when the aligning portion of the housing and the aligning portion of the chuck are joined, the tool is centered relative to the chuck and workpiece.

18. The quick change tool holder for centering a tool at a predetermined angular orientation relative to a workpiece according to claim 17 wherein when an alignment portion is mated to another alignment portion the joined mates are timed at increments of approximately 90° from an adjacent mated alignment portion.

* * * * *